Feb. 18, 1930.  A. BOYNTON  1,747,571
AUTOMATIC WELL FLOWING DEVICE
Filed Nov. 21, 1927
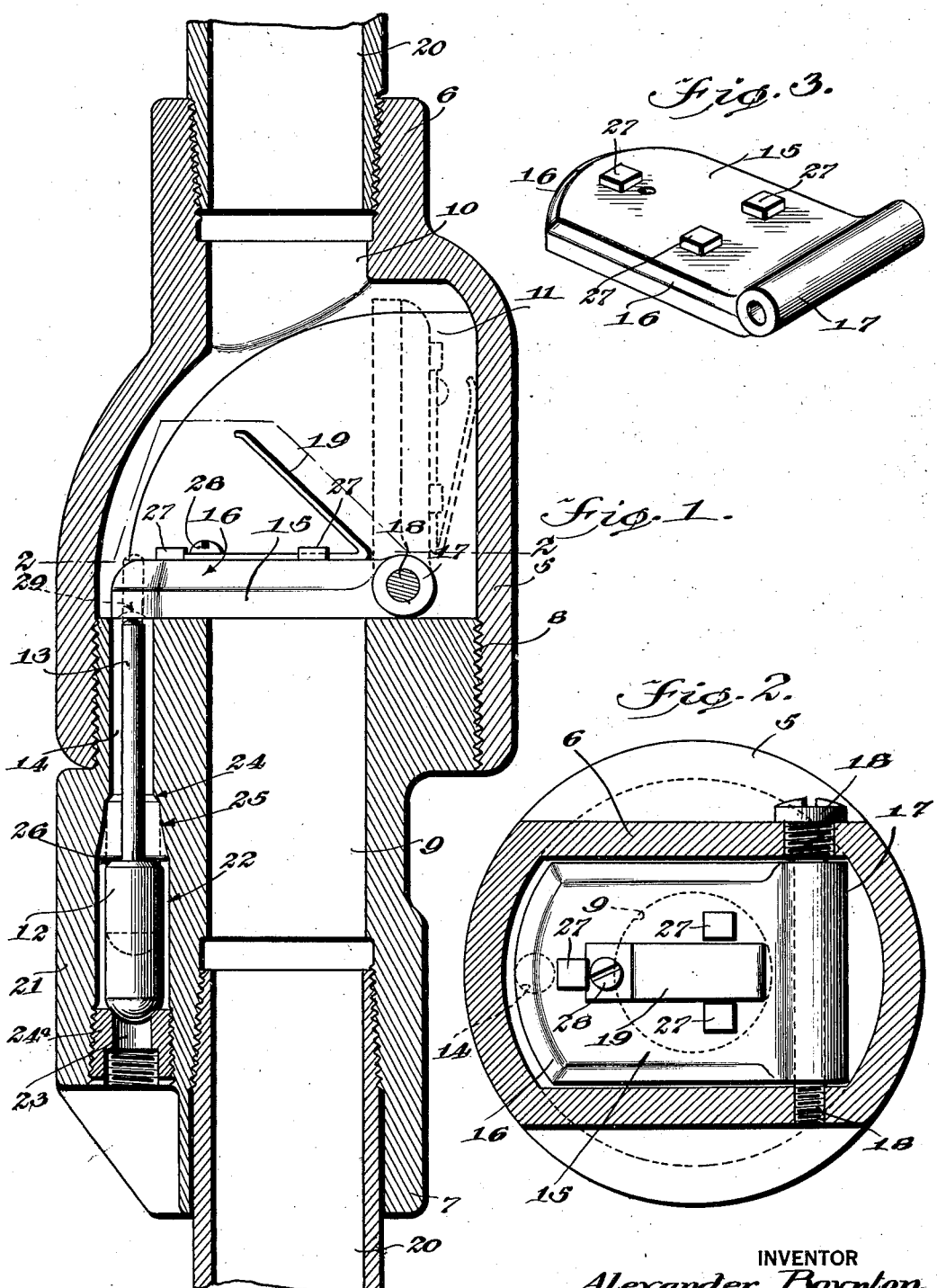
INVENTOR
Alexander Boynton,
BY
ATTORNEY Patented Feb. 18, 1930

1,747,571

UNITED STATES PATENT OFFICE

ALEXANDER BOYNTON, OF SAN ANTONIO, TEXAS

AUTOMATIC WELL-FLOWING DEVICE

Application filed November 21, 1927. Serial No. 234,775.

This invention relates to improvements in automatic well flowing apparatus, and it consists of the constructions, combinations and arrangements herein described and claimed.

An object of the invention is to utilize the velocity of a moving liquid column for the control of the valve element by which the introduction of the lifting energy is regulated.

Other objects and advantages appear in the following specification reference being had to the accompanying drawing, in which, Figure 1 is a longitudinal section of the particular valve apparatus herein concerned, Figure 2 is a cross section taken on the line 2—2 of Figure 1, Figure 3 is a detail perspective view of the valve flap hereinafter referred to.

The invention herein disclosed follows closely the form of valve apparatus disclosed in co-pending applications as follows: Case #16, filed Dec. 1, 1927, Serial #237,051; Case #17, filed Dec. 10, 1927, Serial #239,137; Case #18, filed Nov. 21, 1927, Serial #234,776. As already indicated, the principle upon which the present flowing device operates is the utilization of the velocity of a moving liquid column for the control of a valve element by which the lifting energy is admitted. The lifting energy may consist of a suitable fluid under pressure, for example air or gas.

An outstanding difference between this and the forms of the inventions in the foregoing applications is the substitution of a valve flap as the actuator for the pressure fluid valve element. Reference is made to the drawing. An irregularly shaped valve body 5 has internally threaded extensions 6 and 7 into which adjacent sections 20 of the well tubing (usually known as the tubing string) are screwed.

It is observed that the valve body is composed of two parts. These are secured at 8 by means of screw threads or otherwise. The particular manner of assembling the upper and lower parts of the valve body not only facilitates the initial mounting of the valve flap (referred to later), but also makes possible the easy dis-assembling of the valve body should the necessity for inspection, repair or replacement of the valve flap arise.

The bores 9 and 10 in the lower and upper parts of the valve body communicate with the flap chamber 11 which is made sufficiently large to both accommodate the flap and permit the necessary movement of the latter. It is observed in Figure 2 that the side walls of the chamber 11 are narrowed practically down to the width of the valve flap thus obviating any pocketing or eddying of the liquid in passing through.

An enlargement 21 at one side of the lower part of the valve body has a bore or chamber 22 in which the plunger or valve element 12 is operable. The valve element is capable of engaging either of two seats. The first comprises the edge of inlet bore 23 of the bushing 24 in the lower end of the chamber 22. The second comprises the bevel 24 at the juncture between a constriction 25 and the counterbore 14 with which it communicates. The counterbore communicates with the flap chamber 11. The valve element 12 may be shifted from its engagement with the bushing 24$^a$ by external pressure fluid seeking to enter the conduit, afforded by the valve body and tubing string, and at certain times will engage the seat 24 for which purposes the upper edge of the valve body is bevelled at 26 to make an effective sealing-off engagement. The valve body has a reduced extension or stem 13 partially occupying the reduction 14.

Situated in the chamber 11 is the flap valve 15 previously alluded to. The edges of the flap are bevelled at 16. The side edges of the flap are parallel as in Figure 2 and the forward edge or tip is rounded in agreement with the general contour of the adjacent part of the chamber 11. A barrel 17 along the opposite end or base of the flap receives the pin 18 upon which the flap is pivotally mounted. The ends of the pin are threaded to permit screwing the pin in position.

A spring 19 prevents the valve flap from remaining in a dead center position when raised to the dotted line position in Figure 1 by the liquid flowing in the conduit. In the present instance this spring is of a substantial V-shape. One leg of the V spring is held in position between three lugs 27 on the upper surface of the flap, which position is held by a screw 28 or its equivalent.

The operation is readily understood. The valve apparatus pictured in Figure 1 is located in the casing of a well from which the liquid is to be raised. The valve body 5 and the adjacent sections of the tubing string constitute part of a conduit in which a column of the liquid is to be raised. The reader may imagine the existence of a fluid pressure (either gas or air) on the outside of the valve body.

The valve apparatus may be supposed to be in full operation. The liquid column may be regarded as flowing in the conduit, the velocity thereof sustaining the flap 15 in the raised or dotted line position in Figure 1. The pressure fluid outside of the valve body, tending to escape by way of the conduit holds the valve element 12 in sealing-off engagement with the seat 24. When there is a slowing down of the liquid movement in the well tubing to a sufficient extent the flap 15 will rock over to position whereat it engages the stem 13 now protruding into the chamber 11 causing an unseating of the valve element 12 so that there may be an influx pressure fluid for the enlivening of the now lagging liquid column.

From the preceding description it is obvious that the introduction of pressure fluid will occur at relatively low pressure differentials. The result of admitting additional pressure fluid at appropriate times is to maintain the desired velocity of the upwardly moving liquid column in the tubing. It is necessary that additional lifting energy be introduced upon the occurrence of a diminishing pressure or velocity of the liquid to a predetermined point.

It is to be observed in Figure 1 that there is a space between the extremity of the stem 13 and the flap 15, this space being made by the formation of an appropriate concavity 29 in the adjacent face of the flap. It is also to be observed that the amount of space is exactly the same as the distance between the upper end of the plunger or valve element 12 and the beginning of the constriction 25. The foregoing space provides for free movement of the valve element which is necessary for the initial introduction of pressure fluid.

Obviously it would be undesirable to have the flap 15 stick in the dotted line and raised position in Figure 1. It is also undesirable to have the flap pass to the right of the dead center. The provision of the leaf spring 19 avoids both objections, moreover assisting the flap 15 in its downward rocking motion upon diminution in velocity of the liquid column.

I claim:—

1. In combination a valve body having aligned bores through which a liquid column is adapted to be elevated by fluid under pressure, a valve element controlling the admission of pressure fluid to the valve body and disposed in closed position when the liquid column is moving at the required velocity, a valve depressing flap member pivoted at its base in the valve body and retained in a position offset from the bores by the velocity of the liquid column, but permitted to move to a position to engage and depress with its tip the valve element to an open position to admit pressure fluid to the valve body to accelerate the liquid column when the velocity of the latter diminishes.

2. In combination a valve body having aligned bores through which a liquid column is adapted to be elevated by fluid under pressure, a valve element controlling the admission of pressure fluid to the valve body and disposed in closed position when the liquid column is moving at the required velocity, a valve depressing flap member pivoted in the valve body and retained in a position offset from the bores by the velocity of the liquid column but permitted to move to a position to engage and depress the valve element to open position to admit fluid pressure to the valve body to accelerate the liquid column when the velocity of the latter diminishes, and means for preventing the valve depressing member from occupying a position on dead center.

3. In combination a valve body having aligned bores through which a liquid column is adapted to be elevated by fluid under pressure, a fluid valve element controlling the admission of pressure fluid to the valve body and disposed in closed position when the liquid column is moving at the required velocity, a valve depressing flap member pivoted in the valve body and retained in a position offset from the bores by the velocity of the liquid column, but permitted to move to a position to engage and depress the valve to open position to admit pressure fluid to the valve body to accelerate the liquid column when the velocity of the latter diminishes, and a spring for preventing the valve depressing member from occupying a position on dead center.

4. A valve comprising a body having a chamber forming part of a liquid conduit, and having a passageway connecting the chamber with the outside of the body, a flap pivoted in the chamber at the side remote from the orifice of the passageway and being movable by a liquid column traversing the conduit, and a valve operable in the passageway, being accessible at the orifice to the free extremity of the flap which flap exercises a control over the position of the valve in its throttling action upon the flow of pressure fluid past it.

5. A valve comprising a body having a conduit including a chamber at which a passageway and a bore, which bore forms part of the conduit, have common orifices, a flap pivoted in the chamber gravitating to effect a common closure of the orifices, and a valve in the passageway protruding from the respective orifice by force of pressure fluid flowing in the passageway but being restrained within determined limits by the flap when the flap is lifted by a liquid column actuated by said fluid.

6. A valve comprising a body having a bore and a passageway ending in a chamber, a valve in the passageway capable of gravitating to an initial sealing-off position and moved by force of pressure fluid toward said sealing-off position, a stem on the valve adapted to protrude into the chamber, and a flap pivoted in the chamber across the bore, following the stem to restrain the valve until the valve assumes said sealing-off position whence the flap departs to a position in line with the bore.

7. A valve comprising a body having a liquid conduit and a pressure fluid passage, a valve exercising a throttling function on by-passing fluid and finally assuming a sealing-off position, and a flap in the conduit being pivoted at its base and at its tip contacting the valve to follow the valve to the sealing-off position, there severing contact and moving independently to a position outside of the conduit.

Signed at San Antonio in the county of Bexar and State of Texas this 26th day of October, A. D. 1927.

ALEXANDER BOYNTON.